United States Patent [19]

Leverenz et al.

[11] 4,092,004
[45] May 30, 1978

[54] FEED GRINDER AND MIXER MACHINE

[75] Inventors: John H. Leverenz; John H. Mocho; Robert E. Ambroziak, all of West Bend, Wis.

[73] Assignee: Gehl Company, West Bend, Wis.

[21] Appl. No.: 794,730

[22] Filed: May 9, 1977

[51] Int. Cl.² .................................................. B02C 23/28
[52] U.S. Cl. ...................................... 241/56; 241/101 B; 241/101.6; 241/101.7
[58] Field of Search ................. 241/49, 50, 51, 56, 241/59, 73, 101 B, 101 D, 101.6, 101.7

[56] References Cited

U.S. PATENT DOCUMENTS

| | | | |
|---|---|---|---|
| 3,194,288 | 7/1965 | Dodgen et al. | 241/101.7 |
| 3,199,796 | 8/1965 | Callum et al. | 241/49 |
| 3,735,932 | 5/1973 | Bradley | 241/101 B |
| 3,840,189 | 10/1974 | Kanengieter et al. | 241/56 |

Primary Examiner—Granville Y. Custer, Jr.
Attorney, Agent, or Firm—James E. Nilles

[57] ABSTRACT

An agricultural feed grinder and mixer having a hammermill means which grinds various types of grain and other feed and combines the ground crop material with supplemental feed and thoroughly mixes the combination and discharges it to other containers or storage areas. The machine has a generally horizontal feed screw auger which receives the material from the hammermill and from the supplemental feed hopper and discharges it into a mixing tank. Power is transmitted from a power source, such as a tractor through a power take-off shaft and through the feed screw auger where the power is delivered to a mixing auger in the mixing tank. Sealable means are also provided for use with the feed screw auger and which seals off the hammermill area from the rest of the apparatus such as the dust collector to thereby insure an efficient sucking action of the hammermill blower so that air is sucked efficiently through the hammermill screen and discharged to a dust collector; air is prevented from returning from the dust collector or the supplemental feed hopper by means of the seal means.

9 Claims, 6 Drawing Figures

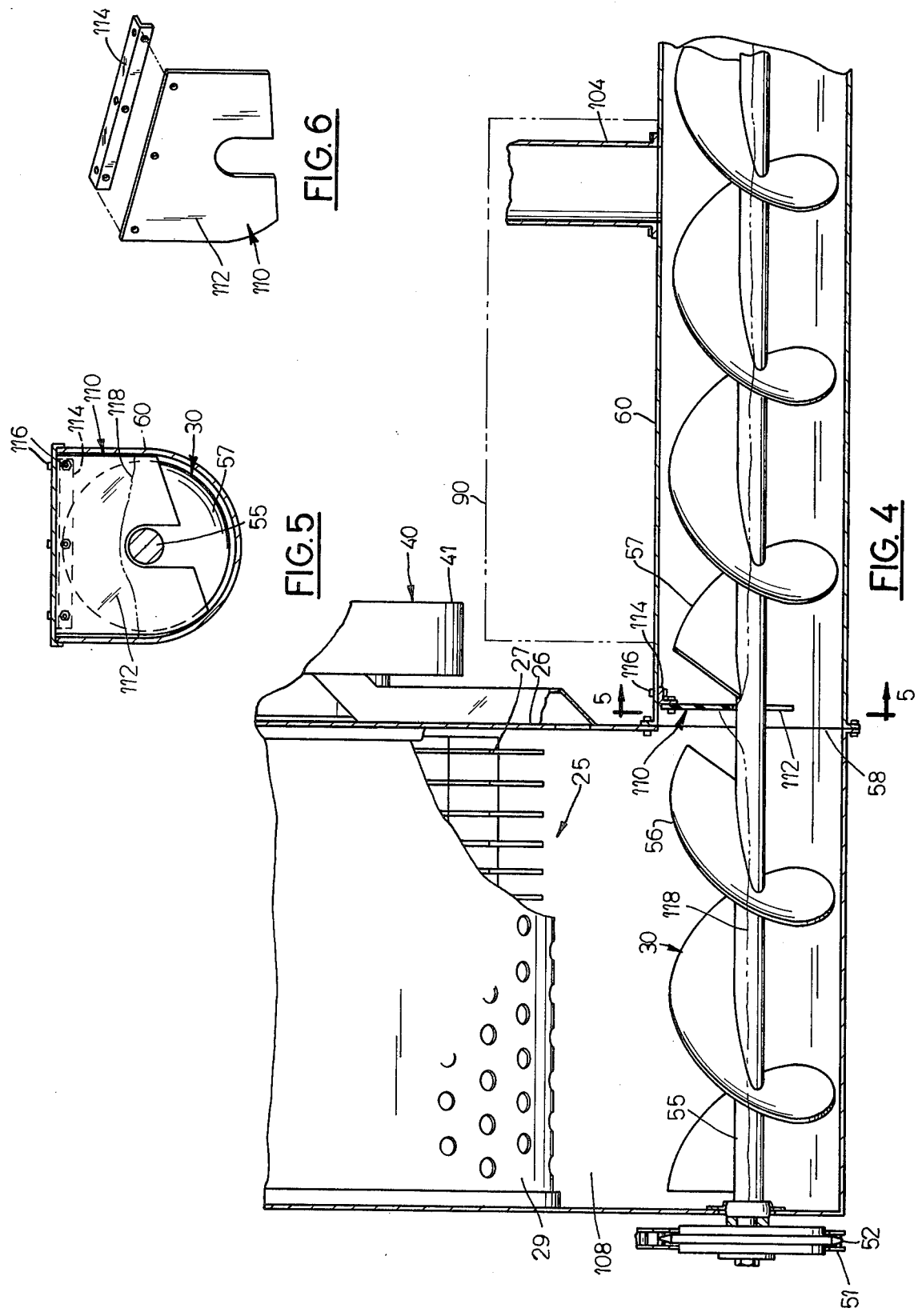

FEED GRINDER AND MIXER MACHINE

BACKGROUND OF THE INVENTION

The invention pertains to feed and mixer apparatus, usually of the portable type which is pulled by a tractor and which receives power therefrom, the apparatus having a hammermill and a supplemental feed hopper through which crop material is fed and then mixed together for delivery to a mixing tank. The hammermill acts to grind the crop material, such as grain, hay and so forth and removes the dust laden air therefrom and delivers it to a dust collector. The ground crop material is received by a feed screw auger which conveys it rearwardly to the mixing auger. Supplemental feed is also introduced into the feed screw auger for delivery along with the ground material to the mixing tank where the two materials are then thoroughly mixed. Devices of this type are shown in the U.S. Pat. No. 3,199,796 issued Aug. 10, 1965 and entitled "Portable Feed Grinder and Mixer"; U.S. Pat. No. 3,735,932 issued May 29, 1973 and entitled "System for Overcoming Transport-Particle-Flow Deficiencies Inherent in Feed Grinding and Mixing Machines using Dust Collectors for the Grinder"; and U.S. Pat. No. 3,840,189 issued Oct. 8, 1974 entitled "Feed Mill and Mixer".

SUMMARY OF THE PRESENT INVENTION

The present invention provides a feed grinder and mixer having a supporting frame on which is mounted a hammermill for grinding the crop material such as various types of grain, hay, or other feed and then delivering it to a generally longitudinally disposed and horizontally arranged feed screw auger means. A blower fan is connected to the hammermill which removes the dust laden air and the inlet of which blower is located on the discharge side of the screen of the hammermill. A supplemental feed hopper delivers supplemental feed to the feed screw auger and the latter then delivers the ground feed as well as the supplemental feed to a mixing tank. The mixing tank includes a vertically arranged mixing auger which acts to thoroughly mix the material which has been delivered to the tank. The invention contemplates using the generally horizontal and longitudinally disposed feed screw auger as the power shaft for transmitting power from the power source, such as a P.T.O. shaft of a tractor and delivering the power to the mixing auger in the tank. In this manner, no auxiliary power shafts, gears, sprockets, etc. are required to drive the mixing auger, but instead the main horizontal feed screw auger acts as a power shaft for driving the main feed screw auger as well as driving the mixing auger in the mixing tank.

Another aspect of the invention relates to a sealing means acting in cooperation with the feed screw auger and which, in conjunction with the ground feed being conveyed by the feed screw auger, acts to seal the discharge side of the hammermill and the inlet side of the blower from air which would otherwise be sucked into the hammermill from either the supplemental feed hopper or from the discharge side of the dust collector.

These and other objects and advantages of the present invention will appear hereinafter as this disclosure progresses, reference being had to the accompanying drawings.

BRIEF DESCRIPTION OF THE DRAWINGS

FIG. 4 is an enlarged, longitudinal, vertical cross sectional view through the hammermill and feed screw auger shown in FIGS. 1 and 2;

FIG. 5 is a transverse sectional view taken generally along the line 5—5 in FIG. 4; and FIG. 6 is a perspective and exploded view of the flexible seal means and its mounting bracket which are otherwise shown in FIGS. 4 and 5.

DESCRIPTION OF A PREFERRED EMBODIMENT

Figure 1:
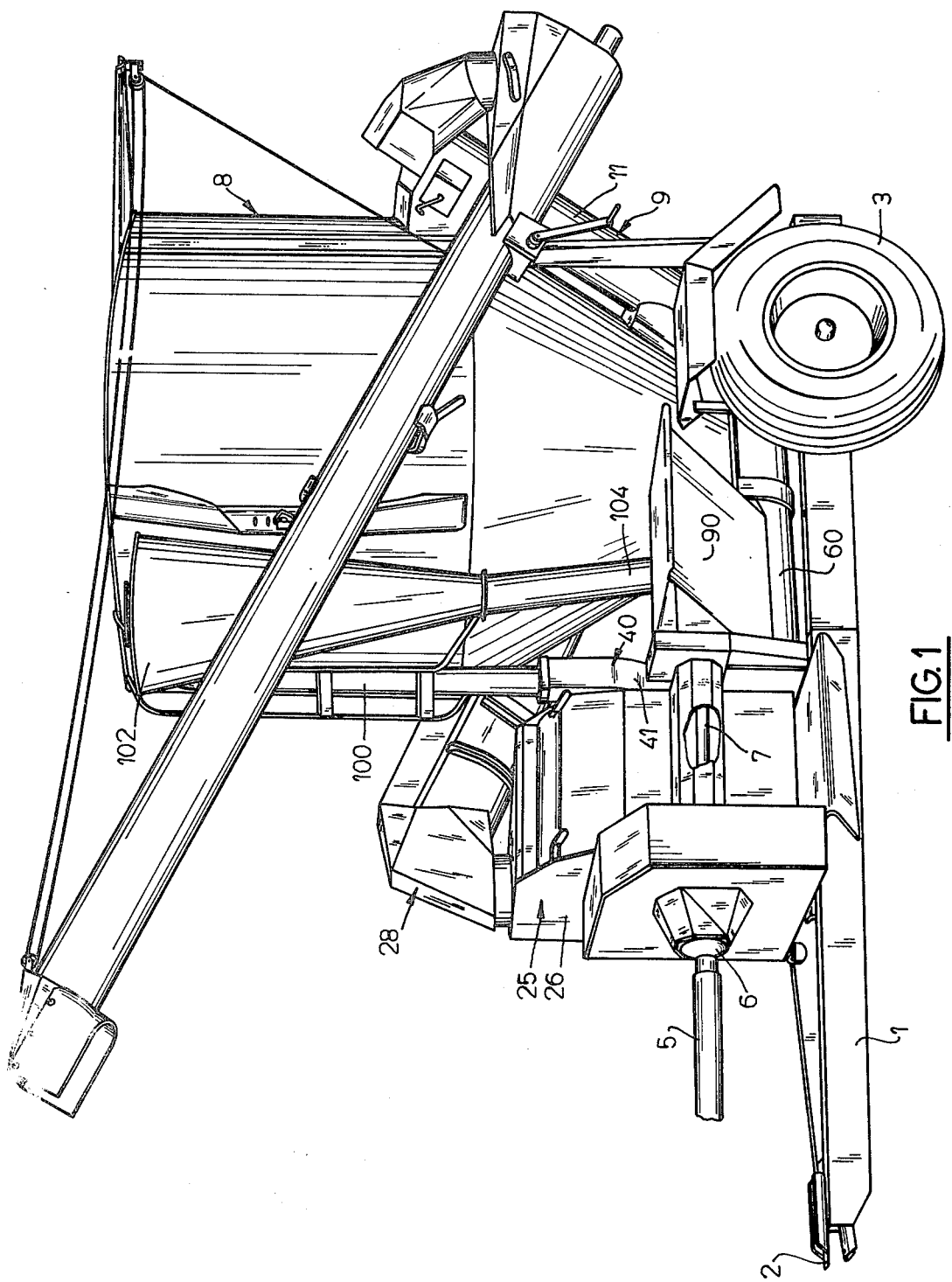
FIG. 1 is a perspective view, taken generally from one side of the feed grinder and mixer apparatus made in accordance with the present invention.
Figure 2:
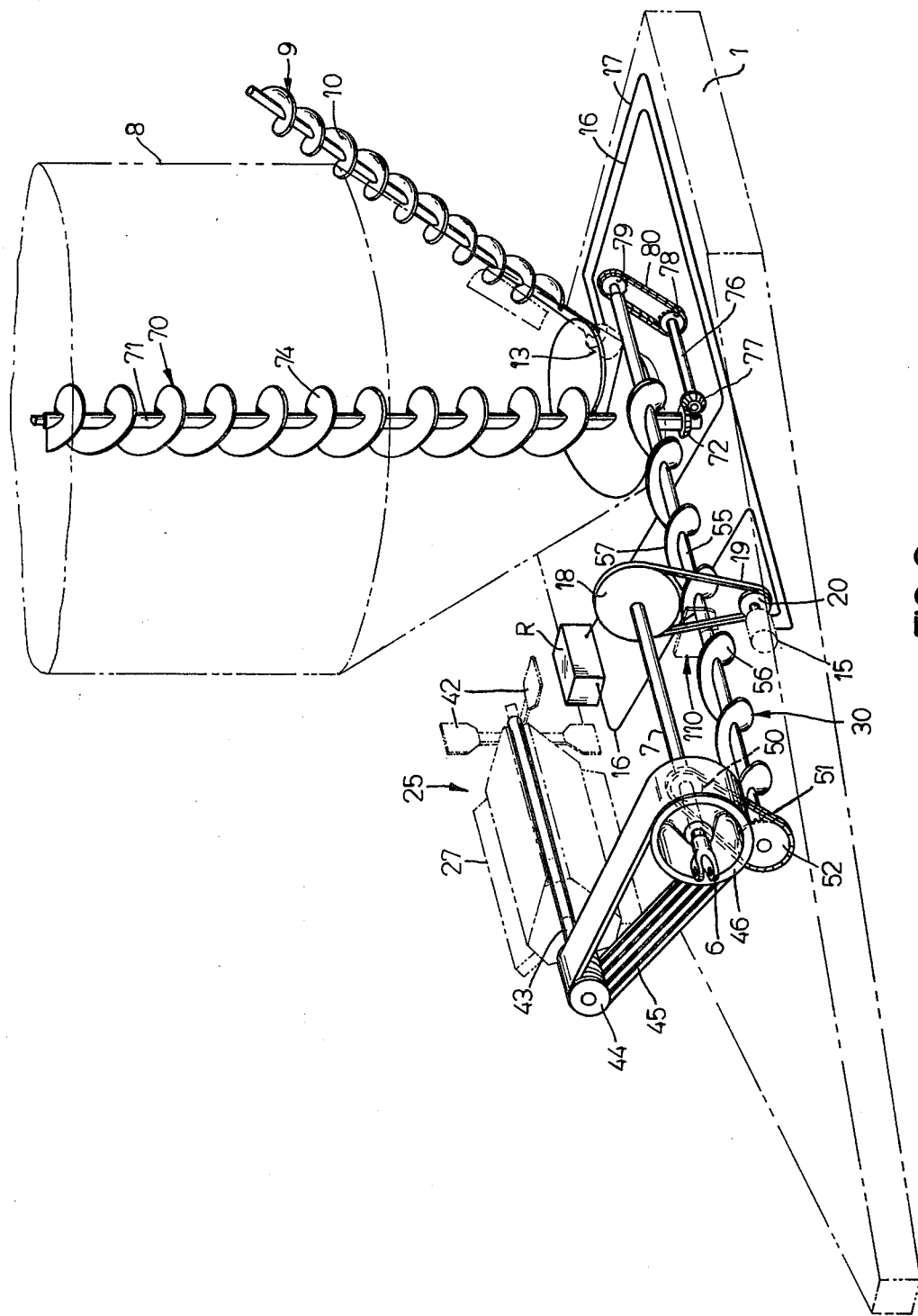
FIG. 2 is a perspective, generally schematic view of certain portions of the of the apparatus as shown in FIG. 1, certain parts being shown as broken away, removed, or in phantom for the sake of clarity.
Figure 3:
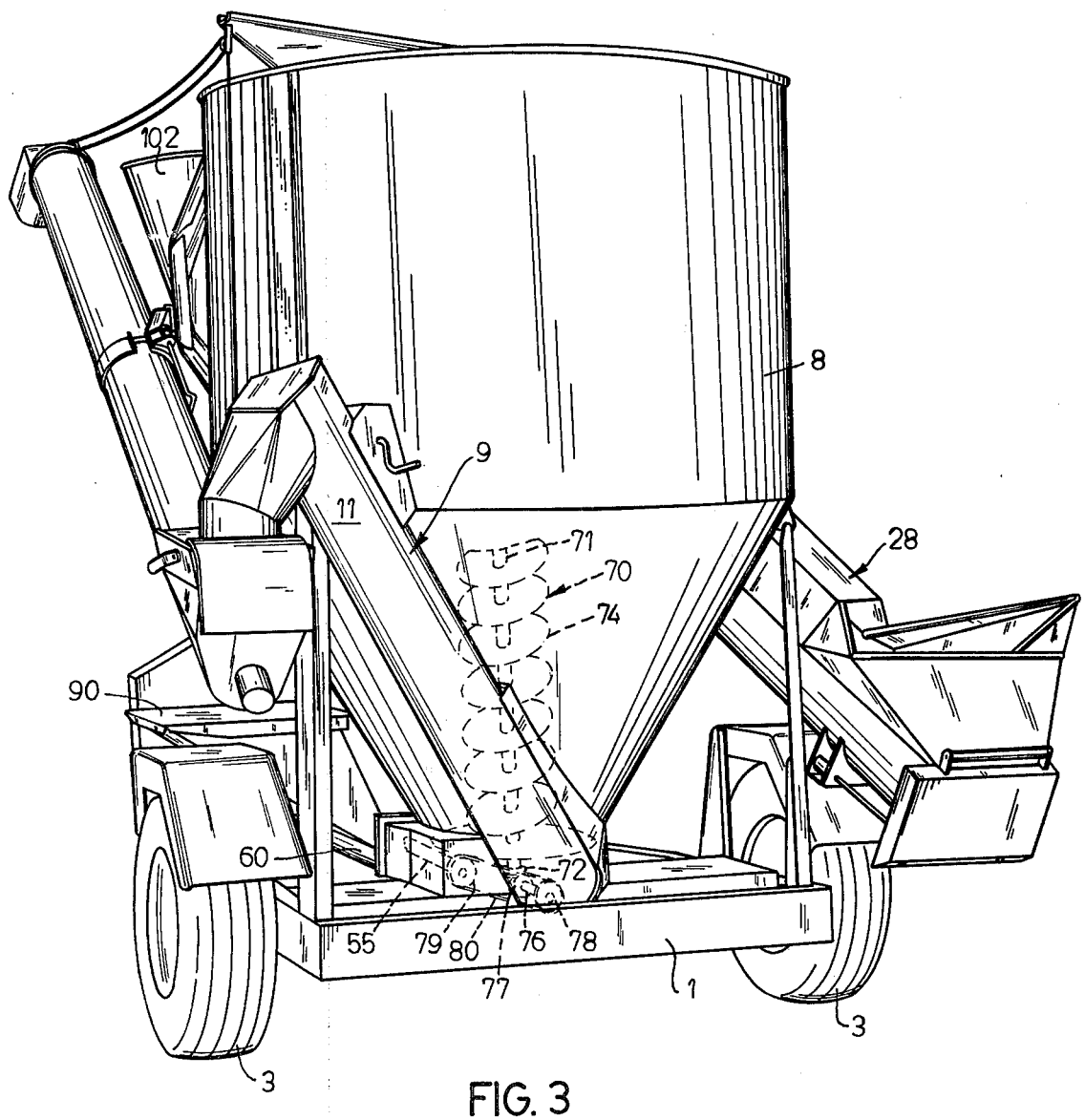
FIG. 3 is a generally rear and perspective view of the mixer shown in FIG. 1, certain parts being shown as broken away or in dotted lines for the sake of clarity.

The general organization of the apparatus includes a generally horizontal frame 1 having a front end 2 that is adapted to be attached to a vehicle, such as a tractor (not shown). A pair of ground transport wheels 3 are rotatably journalled at the rear end of the frame and are laterally spaced apart to give good stability to the apparatus. The tractive vehicle provides power for driving the vehicle components and other parts of the apparatus by means of a P.T.O. shaft 5 that extends longitudinally and rearwardly of the vehicle and is coupled by a joint 6 (FIGS. 1 and 2) to a power shaft rotatably journalled on the frame of the apparatus.

A generally vertically disposed and cylindrical mixing tank 8 is mounted rearwardly on the frame and unloading auger means 9 is secured to the rear end of the tank 11 and can unload the tank 8 when the auger 10 located in the cylindrical housing 11 is drivingly rotated by means of a hydraulic motor 13. The hydraulic motor 13 receives pressure fluid from pump 15 via conduit 17 and the fluid returns to the hydraulic reservoir R via conduit 16. The hydraulic pump 15 is driven by a sheave 18 through the flexible belt 19 which is then trained around the smaller pulley 20 secured to the hydraulic pump. The hydraulic motor 13 is selectively actuated by the operator whenever it is desired to unload the tank and is operated independently of other component parts.

The apparatus also includes a hammermill means 25 which includes the housing 26 surrounding the hammermill rotor 27 and the latter of which revolves within the perforated plate or screen 29. Material is fed from the loading conveyor 28 through the top of the housing 26 and is ground by the hammermill and the ground material is then discharged through the apertures in the screen 29 to the bottom portion of the housing 26 and more specifically to the screw auger means 30. A blower 40 is located alongside the rear end of the hammermill housing 26 and includes the blower housing 41 in which is rotatably driven the series of fan paddles 42. The fan paddles are mounted on shaft 43 which in turn is driven by the multiple V-belt pulley 44 on its opposite end, the multiple V-belts 45 which are trained around the large multiple V-belt pulley 46. The latter is secured to the drive shaft 7. Thus, the shaft 43 of the hammermill acts to drive the fan 42 and also drives the hammermill rotors 27 mounted thereon.

The drive shaft 7 also has a sprocket 50 secured thereto around which is trained a roller chain 51. Another roller chain sprocket 52 is rigidly secured to the feed screw auger means 30 by being rigidly attached to the central shaft 55 of the feed screw auger.

The feed screw auger means 30 is disposed generally horizontally and longitudinally of the apparatus and includes not only the central drive shaft 55, but also the screw auger flights 56 and 57 which are secured thereto. By referring to FIG. 4, it will be noted that the flights 56 and 57 provide a discontinuous section adjacent the discharge side of the hammermill housing 26. In other words, the hammermill housing 26 has an opening 58 so that the ground material which is delivered through the screen 29 to the auger flight 56 is delivered from the housing 26 and into the U-shaped housing 60 which also forms part of the feed screw auger means. The material is then delivered through the U-shaped housing 60 by means of the auger flight 57 and rearwardly to the mixing tank 8 for discharge into the tank 8.

The mixing tank 8 includes a vertically disposed auger means 70 comprised of a central vertical shaft 71 to the bottom of which is secured a bevelled gear 72. The mixing auger 70 also includes a helical auger flight 74 which serves to mix the material in the tank 8 as the mixing auger is drivingly rotated. The auger means 70 receives its power from the shaft 55 of the horizontal auger means 30, more specifically, a lay shaft 76 suitably journalled in the frame 1 has a bevelled gear 77 fixed thereto in constant mesh with gear 72 of the mixing auger 70. A pair of roller chain sprockets 78 and 79 are secured respectively to the lay shaft 76 and shaft 55 and are drivingly connected together by the roller chain 80 which is trained around both sprockets 78 and 79.

With the above arrangement, the power from the take-off shaft is delivered through the shaft 7 and it is then directed via the multiple V-belt 45 to the hammermill and via roller chain 51 to the horizontal auger means 30. The auger means 30 is then used to deliver power to the vertical mixing auger 70 without the use of additional drive shafts or mechanism.

A supplemental feed hopper 90 is located intermediate the length of the horizontal auger means 30 and supplemental feed is delivered from it by gravity into the U-shaped housing 60 of the auger means 30. Thus, as the ground material is delivered by the auger means 30 rearward to the tank 8, supplemental feed is also delivered by the auger means to the mixing tank 8 where both materials are then thoroughly mixed. The blower 40 attached to the hammermill acts to suck air from the discharge side of the screen 29 (FIG. 4) and blows the dust laden air upwardly through conduit 100 and to the dust collector 102. The air is separated from the dust and discharged upwardly to the atmosphere while the dust itself drops by gravity via conduit 104 and into the cylindrical casing 60 of the auger means 30 for ultimate delivery to the mixing tank by the auger means 30. In order to insure that the blower 40 operates efficiently to suck the air from the discharge chamber 108 (FIG. 4) of the hammermill, a sealing means 110 (FIGS. 4, 5 and 6) is provided closely adjacent the hammermill housing 26. This sealing means includes a vertically disposed, flexible plate 112 which is made of rubber for example, and which substantially closes the cross-sectional area of the cylindrical housing 60. The flexible member 110 is mounted on bracket 114 to which it is secured and the bracket 114 of which is secured by bolt means 116 to the top of the generally cylindrical housing 60. It will be noted from FIG. 5 that the flexible means 112 does not completely fill the housing 60, but when the ground material, the height of which is indicated by the broken line 118 (FIG. 4) passes through the casing 60, then acts in cooperation with the flexible member 112 to form an air seal in the screw auger means. In this manner, air is prevented from returning to the chamber 108 from the dust collector conduit 104 and air is also prevented from being sucked through the supplemental feed hopper 90, through housing 60 and into the chamber 104 of the feed mill. Thus, whenever material is being conveyed from the hammermill through the horizontal auger means 30, an effective seal is produced for preventing unwanted air from being sucked into the hammermill chamber, thereby enhancing the efficiency of the blower 40. On the other hand, the flexible member 110 permits the complete and uninhibited flow of the ground material from chamber 108 by the auger means 30.

RECAPITULATION

By means of the present invention, the generally horizontal and longitudinally disposed main feed screw auger means is driven through its central shaft which in turn acts as a power shaft for transmitting power to the vertically disposed mixing auger, thereby eliminating many component parts found in prior art machines. In addition, the present invention provides an effective seal in such feed screw auger means and which insures efficient operation of the blower of the hammermill by preventing unwanted air from being returned to the hammermill discharge chamber from either the dust collector or the supplemental feed hopper.

We claim:

1. A feed grinder and mixer apparatus comprising, a main frame, a hammermill having an inlet and a discharge side and mounted on said frame and for receiving and grinding feed, a mixing tank mounted on the frame, a mixing auger rotatably mounted in said mixing tank, a generally horizontal and longitudinally disposed feed screw auger means communicating with and for receiving ground material from said hammermill; said feed screw auger means including a central power shaft, screw flights secured to said shaft and a casing in which said power shaft and flights are rotatably driven, power means for rotating said power shaft and said flights secured thereto, whereby ground material from said hammermill is delivered by said screw auger means to said mixing tank, and a power drive connection between said power shaft of said screw auger means and said mixing auger whereby the latter is driven by said power shaft, said power drive connection including, a lay shaft journalled in said frame, constant mesh bevel gears on said mixing auger and on said lay shaft, sprockets connected to said lay shaft and said power shaft, and an endless chain drivingly connecting said sprockets.

2. The apparatus set forth in claim 1 including a supplemental feed hopper mounted on said frame and having a discharge connection with said feed screw auger means whereby supplemental feed can be combined with said ground material from said hammermill and conveyed into said mixing tank.

3. A feed grinder and mixer apparatus comprising, a main frame, a hammermill having an inlet and a discharge side and mounted on said frame and for receiving and grinding feed, a mixing tank mounted on the frame, a mixing auger rotatably mounted in said mixing tank, a generally horizontal and longitudinally disposed feed screw auger means communicating with and for receiving ground material from said hammermill; said feed screw auger means including a central power shaft, screw flights secured to said shaft and a casing in which said power shaft and flights are rotatably driven, power means for rotating said power shaft and said flights secured thereto, whereby ground material from said hammermill is delivered by said screw auger means to said mixing tank, a blower having an inlet connection with said discharge side of said hammermill and for removing dust laden air therefrom, flexible seal means cooperating with said feed screw auger means to prevent air from entering said hammermill discharge side, and a power drive connection between said power shaft of said screw auger means and said mixing auger whereby the latter is driven by said power shaft.

4. The combination as described in claim 3 further characterized in that said flexible seal means comprises a downwardly depending flexible plate-like member in said casing of said feed screw auger means.

5. A feed grinder and mixer apparatus comprising, a main frame, a hammermill having an inlet and a discharge side and mounted on said frame and for receiving and grinding feed, a mixing tank mounted on the frame, a mixing auger rotatably mounted in said mixing tank, a generally horizontal and longitudinally disposed feed screw auger means communicating with and for receiving ground material from said hammermill; said feed screw auger means including a central power shaft, screw flights secured to said shaft and a casing in which said power shaft and flights are rotatably driven, power means for rotating said power shaft and said flights secured thereto, whereby ground material from said hammermill is delivered by said screw auger means to said mixing tank; a supplemental feed hopper mounted on said frame and having a discharge connection with said feed screw auger means whereby supplemental feed can be combined with said ground material from said hammermill and conveyed into said mixing tank; a blower having an inlet connection with said discharge side of said hammermill and for removing dust laden air therefrom, and flexible seal means cooperating with said feed screw auger means to prevent air from entering said hammermill discharge side; and a power drive connection between said power shaft of said screw auger means and said mixing auger whereby the latter is driven by said power shaft.

6. The combination as described in claim 5 further characterized in that said flexible seal means comprises a downwardly depending flexible plate-like member in said casing of said feed screw auger means.

7. A feed grinder and mixer apparatus comprising, a main frame, a hammermill having an inlet and a discharge side and mounted on said frame and for receiving and grinding feed, a mixing tank mounted on the frame, a generally horizontal and longitudinally disposed feed screw auger means communicating with and for receiving ground material from said hammermill, said feed screw auger means including a rotatable auger and a casing in which said auger is located, power means for rotating said auger, whereby ground material from said hammermill is delivered by said screw auger means to said mixing tank, a blower having an inlet connection with said discharge side of said hammermill and for removing dust laden air therefrom, and flexible seal means cooperating with said feed screw auger means to prevent air from entering said hammermill discharge side.

8. The apparatus set forth in claim 7 including a supplemental feed hopper mounted on said frame and having a discharge connection with said feed screw auger means whereby supplemental feed can be combined with said ground material from said hammermill and conveyed into said mixing tank.

9. The combination as described in claim 7 further characterized in that said flexible seal means comprises a downwardly depending flexible plate-like member in said casing of said feed screw auger means.

* * * * *